July 4, 1967    G. L. HITZ    3,329,447
SELF-ENERGIZING SEAL FOR HIGH PRESSURE FLANGED CONNECTIONS
Filed Jan. 18, 1965    2 Sheets-Sheet 1
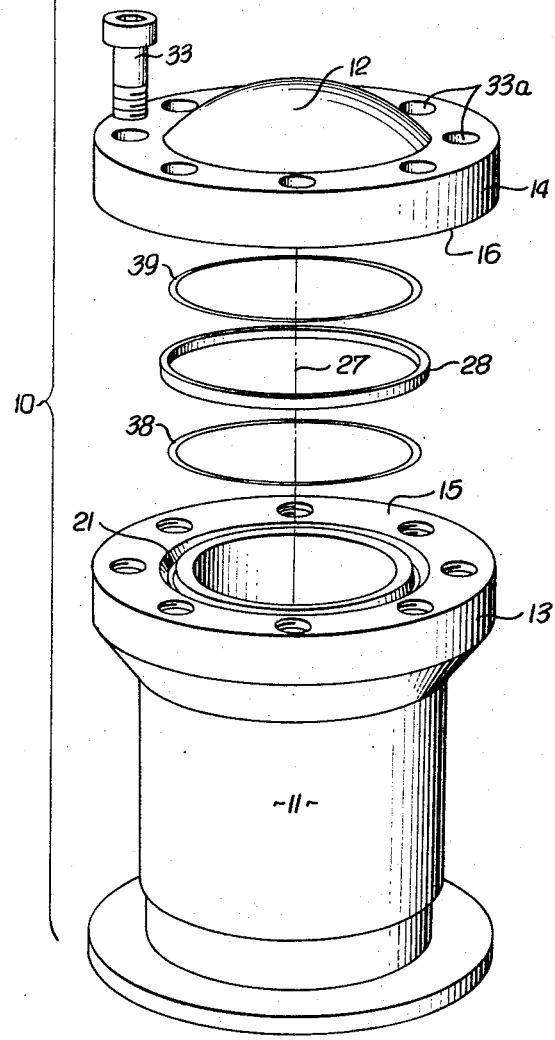
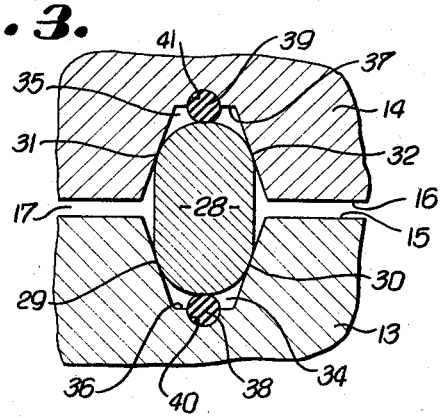
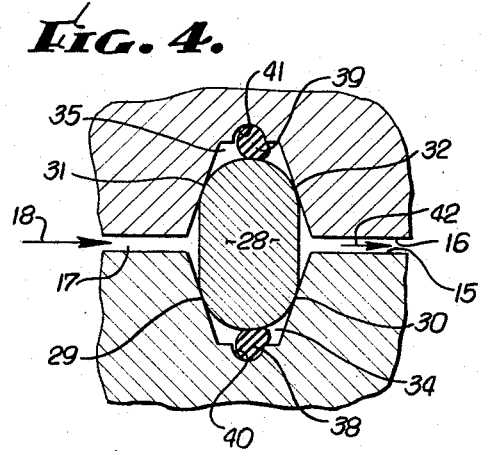
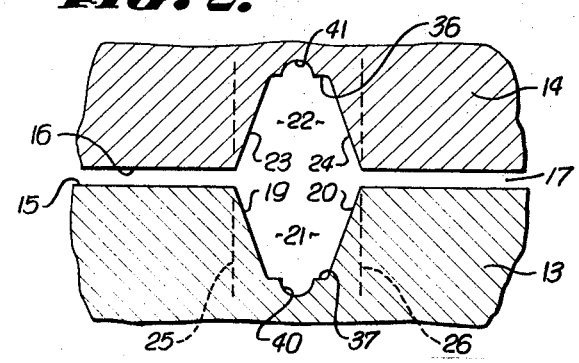
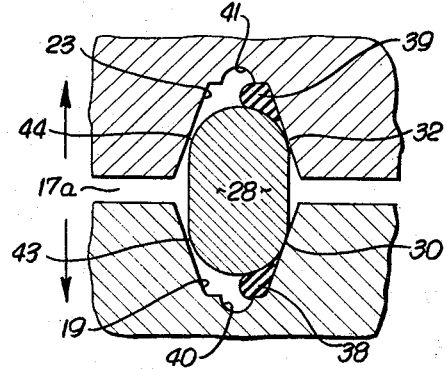
GIFFORD L. HITZ
INVENTOR
by White & Haefliger
ATTORNEYS.

July 4, 1967   G. L. HITZ   3,329,447
SELF-ENERGIZING SEAL FOR HIGH PRESSURE FLANGED CONNECTIONS
Filed Jan. 18, 1965   2 Sheets-Sheet 2
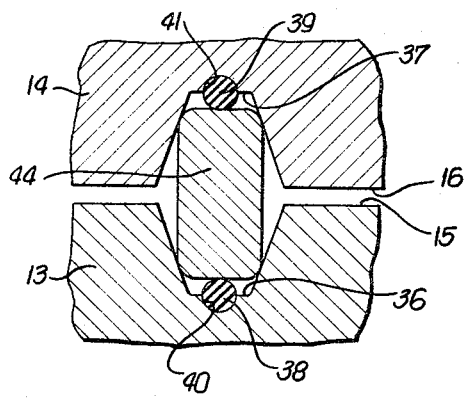
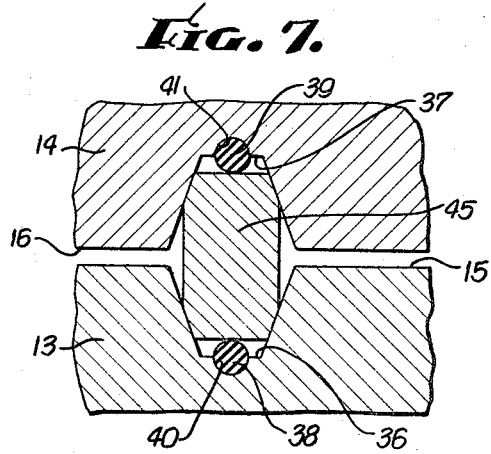
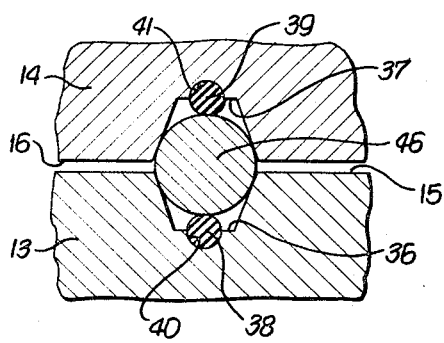
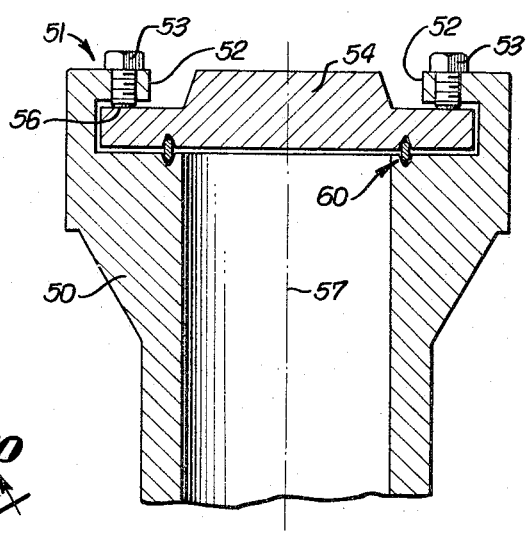
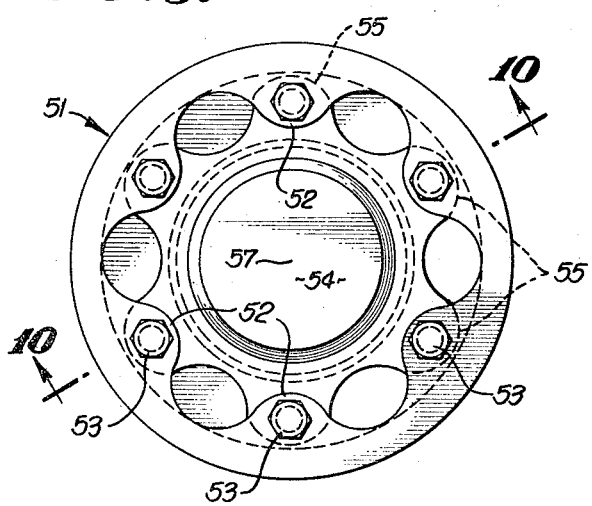
GIFFORD L. HITZ
INVENTOR
by White & Haefliger
ATTORNEYS.

United States Patent Office 3,329,447
Patented July 4, 1967

3,329,447
SELF-ENERGIZING SEAL FOR HIGH PRESSURE
FLANGED CONNECTIONS
Gifford L. Hitz, 10542 Vestone Way,
Los Angeles, Calif. 90024
Filed Jan. 18, 1965, Ser. No. 426,266
9 Claims. (Cl. 285—113)

This invention relates generally to high pressure seals and more particularly concerns improvements in sealing of heavy duty piping and pressure vessels subjected to high pressure and temperature conditions.

Past efforts to seal off flanged pipe or pressure vessels connections have been directed toward the use of sealing devices such as the sharply pointed "delta ring," the "wave ring," and simple metal or rubber O-rings. In many instances such past methods have proved unsatisfactory due to the fact that undesirably fine surface finishes and close tolerances in machining are required, and also because of rapid deterioration of the seals in service.

The present invention has for its major object the provision of a reliable, low cost means for sealing heavy duty connections in such manner as will circumvent or eliminate the prior problems mentioned above, as well as others. Basically, the improved high pressure seal construction comprises a pair of bodies extending in face to face relation and having walls forming opposite grooves sunk in the body faces, the grooves configured to taper away from each other, together with means to seal off between the bodies including a metallic annulus received in both grooves to pressurally contact the groove forming walls and to form therewith annular pockets located between the groove bottoms and the annulus; further the means to seal off between the bodies includes rings in the pockets and formed of relatively rigid internally tenacious material; and finally, the metallic annulus is deformable under sufficiently high fluid pressure exerted against one side thereof and acting to urge the annulus against body walls at the opposite side of the annulus so that the fluid pressure may be applied via the pockets to displace the rings therein into pressure sealing wedging contact with the annulus and the body walls at the opposite side of the annulus. As a result the seal assembly is mobile and self energizing in the sense that increasing pressure of the contained fluid such as gas will improve the effectiveness of the seal, the metal annulus being confined yet free for limited movement generally outwardly to press more firmly against the outer sloping walls of both grooves; further, the metal ring not only coacts with the outer walls of the grooves to form metal to metal seals remaining effective during relative separation of the grooves as during temperature or pressure increase, but also the metallic annulus coacts with the elastomer O-rings in the pockets which serve as low pressure seals, the O-rings remaining blocked by the annulus against escape from the pockets during said groove relative separation. In addition, the construction is such that any minor misalignment or inaccuracy in fit-up of the annulus and grooves is compensated for as the connections or flanges are brought together by bolt-up or other means.

Other features of the invention include the provision of screw fasteners spaced about the body central axis and the grooving and annulus to transmit tension or compression loading in such manner as to accommodate limited separation of the grooving in service; the provision of annular recesses adjacent the groove bottoms sized to closely receive the O-rings, locate and maintain the latter in compression between the groove bottoms and the annulus; and the forming of the metallic annulus to have generally, oval, octagonal, rectangular or circular cross sections in axial radial planes, as will appear.

These and other objects and advantages of the invention, as well as the details of an illustrative embodiment, will be more fully understood from the following detailed description of the drawings, in which:

FIG. 1 is an exploded perspective showing of a heavy duty pressure vessel equipped with a seal assembly and incorporating the invention;

FIG. 2 is an enlarged vertical section showing the seal grooving in the flanges to be connected as seen in FIG. 1;

FIG. 3 is a view like FIG. 2, but showing the oval metallic annulus and O-rings assembled in the grooving;

FIG. 4 is a view like FIG. 3 but showing the displacement of the O-rings under low fluid pressure application;

FIG. 5 is a view like FIG. 4, but showing the altered positions of the elements under high pressure and temperature application;

FIGS. 6–8 are views like FIG. 3 but showing modified forms of the metallic annulus;

FIG. 9 is a plan view showing of a modified pressure vessel cap, body and fastener design for use with the sealing equipment; and FIG. 10 is a section taken on the line 10—10 of FIG. 9.

Referring first to FIGS. 1–3, a heavy duty pressure vessel assembly 10 is shown to include a body 11, a cap 12 and annular flanging 13 and 14 thereon. The flanges extend in face to face relation and have walls forming opposite grooves sunk in the body faces 15 and 16. In this regard, the separation of the faces in FIGS. 2–4 is somewhat exaggerated for purposes of illustrating the effect of the presence of clearance 17 therebetween, such clearance allowing gas pressure to be transmitted therethrough in the outward direction of the arrow 18 in FIG. 4.

In the form of the invention illustrated, the walls 19 and 20 of the body flange 13 form a groove 21 which lies opposite a groove 22 formed by walls 23, 24 of the body flanges 14. As is clear from FIG. 2, the grooves 21 and 22 are configured to taper away from each other, and the walls of the grooves are typically tapered at between 15 and 25 degrees with respect to cylinders indicated by the broken lines 25 and 26. In this regard, the grooves, walls and mentioned cylinders extend generally coaxially about central axis 27 of the vessel.

In accordance with the invention, means is provided to seal off between the bodies such as 11 and 12, and including a metallic annulus received in both grooves to pressurally contact the groove forming walls and to form therewith annular pockets located between the groove bottoms and the annulus. One form of such annulus is seen at 28 in FIG. 3 to be received in both grooves 21 and 22 and to pressurally contact the groove forming walls 19 and 20 at locations 29 and 30 respectively, and the walls 23 and 24 at the locations 31 and 32 respectively. Such contact is established during makeup or bolt-down of the cap flange 14 on the body flange 13, the cap screws 33 being provided as an illustration as a means transmitting motion to urge the body flanges relatively toward one another so as to grip the annulus 28 therebetween. FIG. 3 also illustrates one form of annular pockets 34 and 35 located between the grooved bottoms 36 and 37 and the annulus.

The invention also contemplates the inclusion of rings in the pockets and formed of relatively rigid internally tenacious material such as rubber, silicon plastic, or Teflon, these being examples of such a material. In the form of the invention shown in FIG. 3, the rings are seen at 38 and 39 to comprise rubber O-rings closely received at least partially within recesses 40 and 41 adjacent the groove bottoms. In this regard, the pockets 34 and 35 may be considered to include such recesses, the latter being sized so that the rings 38 and 39 are compressed between the groove bottoms and the annulus 28 upon initial assembly as seen in FIG. 3. Typically, the concave recesses 40 and 41 have sufficient depth to accommodate approximately fifty percent of the O-rings, the latter being distorted about 20 percent upon initial assembly to effect an initial low pressure soft seal at the same time that the initial hard metal to metal seal is established at the annular locations 29–32 mentioned above. Further, the clearance 17 between the flange faces 15 and 16 is not critical and may be made large enough to accommodate reasonable tolerances in the machined width of the grooves 21 and 22.

After assembly of the annulus 28 and the O-rings 38 and 39, and tightening of the cap screws 33 which project downwardly through the holes 33a in the flange 14 and into the tapped holes 41 in the flange 13, the vessel is sealed and ready for the application of internal pressure. In this regard, reference is first made to FIG. 4 showing pressure application at 18 tending to leak past the metal to metal seal locations 29 and 30, and becoming applied to the O-rings 38 and 39, thus sealing off between the annulus 28 and the bottom walls of the grooves to hold the pressure. As the O-rings become deformed toward the metal to metal seal locations 30 and 32, trapped air between such locations and the O-rings leaks past the metal to metal seals at 30 and 32 and to the exterior as indicated by the arrow 42.

FIG. 5 illustrates the condition of the elements upon the application of high internal pressure, as for example several thousand p.s.i., such pressure and also high temperature, as for example 500° F., tends to expand the flanges 13 and 14 relatively away from one another to enlarge the clearance therebetween as indicated at 17a. For example, the cap screws or bolts 33 may lengthen elastically in accordance with Hooke's law, increasing the size of the clearance. As the internal fluid pressure increases, the annulus 28 yields sufficiently to move outwardly, increasing the metal to metal sealing pressure at the locations 30 and 32 so as to increase the effectiveness of the seals at such locations. At the same time, relative sliding movement may occur as between the annulus 28 and the walls 20 and 24 as the flanges separate, and also gaps may be created at the locations 43 and 44 between the annulus and the walls 19 and 23. The construction is such that the annulus 28 is free to move outwardly as pressure increases, there being no restriction to such movement imposed by friction areas or by rigid pivot points, the latter being disadvantageous and leading to loss of sealing effect. In this regard, the sealing locations 30 and 32 in FIG. 5 are seen to be characterized by a very small area of metal to metal contact, as provided by the greater convexity of the surface of the annulus at such points, as compared with the configuration of the groove walls 20 and 24.

FIG. 5 also illustrates the action of the O-rings 38 and 39 under high pressure, these tending to leave the recesses 40 and 41 and to crowd into the tapering gaps between that the annulus 28 is free to move outwardly as pressure sides of the seal locations 30 and 32. As a result, the sealing effect is enhanced. It should be mentioned that the annulus 28 is designed to permanently yield or deform at the higher pressure application in order to establish the desired metal to metal seals at the locations 30 and 32 even though the walls 20 and 24 may be somewhat unsymmetric with respect to each other and the clearance 17. Merely as an illustration, the annulus 28 may comprise a soft iron yielding at 24,000 p.s.i.

FIGS. 6–8 respectively show different forms of the metal annulus, the latter having generally rectangular form 44 in FIG. 6, generally octagonal form 45 in FIG. 7 and generally circular form 46 in FIG. 8, these cross sections being taken in axial radial planes.

While the cap screws 33 are subject to tension loading in FIGS. 1–5, they may alternately be subjected to pressure loading in a manner that now will be described. For this purpose, FIGS. 9 and 10 shows the vessel to include one body 50 having inwardly turned flanging at 51 forming circularly spaced projections 52 supporting the cap screws or screw fasteners 53. The other body or cap 54 of the vessel has circularly spaced peripheral projections 55 receiving loading transmitted by the terminals 56 of the cap screws 53. For this purpose, the projections 52 and 55 may overlap as indicated. In addition, the projections on said bodies may have circular spacing characterized as allowing assembly of the bodies toward one another, i.e. axially with respect to axis 57, followed by relative circular displacement of the bodies to bring the projections into overlapping relation. Thus, as cap 54 is moved from the broken line position 58 to the full line position seen in FIG. 10, the projections 55 pass through the circular gaps 59 formed between the projections 52 of flanging 51 on the body 50. Thereafter, the cap is rotated about the axis 57 only to sufficient extent to place the projections 55 beneath the projections 52 in order that the cap screws 53 may bear against the projections 55.

The sealing elements in FIGS. 9 and 10 are the same as are described in connection with FIGS. 1–5, and are generally indicated at 60. In this regard, the sealing elements accommodate very well the relative assembly of the bodies 50 and 54 in the manner described above. One important advantage of the FIGS. 9 and 10 construction lies in the reduced axial separation of the bodies 50 and 54 under high pressure and high temperature conditions.

I claim:

1. An improved high pressure seal construction, comprising a pair of bodies extending in face to face relation and having walls forming opposite grooves sunk in the body faces, the grooves configured to taper away from each other, and means to seal off between the bodies including a metallic annulus received in both grooves to pressurally contact the groove forming walls and to form therewith annular pockets located between the groove bottoms and the annulus, said means including rings in the pockets and formed of relatively rigid internally tenacious material, said bodies gripping the annulus therebetween, the annulus, grooves and rings being generally coaxial, the pockets including annular recesses adjacent the groove bottoms and sized to closely receive the rings so that the rings are compressed between the groove bottoms and annulus, the recesses having substantially less width than the pocket overall width radially of the ring axis, the rings being free of attachment to the annulus, the groove bottoms blocking access therethrough to the rings, the annulus being deformable under sufficiently high fluid pressure exerted against one side thereof and acting to urge the annulus against body walls at the opposite side of the annulus so that said fluid pressure may be applied via said pockets to bodily displace the rings therein away from the groove bottoms and into positions wherein the bulk of the ring material is out of the recesses and in pressure sealing wedging contact with said annulus and said body walls at said opposite side of the annulus and means transmitting loading to urge said bodies relatively toward one another so as to grip the annulus therebetween.

2. The combination of claim 1 in which said last named means includes screw fasteners circularly spaced apart about said axis and transmitting tension loading.

3. The combination of claim 1 in which said last named means includes screw fasteners circularly spaced apart about said axis and transmitting compression loading, one of said bodies supporting said screw fastener at the side of the other body opposite the grooved face thereof.

4. The combination of claim 3 in which said other body has circularly spaced peripheral projections receiving loading transmitted by said screw fasteners, said one body having circularly spaced projections overlapping said one body projections.

5. The combination of claim 3 in which said one body has inwardly turned flanging forming circularly spaced projections supporting said screw fasteners, and said other body has circularly spaced peripheral projections receiving loading transmitted by said screw fasteners, said body projections circular spacing characterized as allowing assembly of the bodies toward one another and relative circular displacement to bring the body projections into overlapping relation.

6. The combination of claim 1 in which said annulus has generally oval cross sections in axial radial planes.

7. The combination of claim 1 in which said annulus has generally octagonal cross sections in axial radial planes.

8. The combination of claim 1 in which said annulus has generally rectangular cross sections in axial radial planes.

9. The combination of claim 1 in which said annulus has generally circular cross sections in axial radial planes.

References Cited

UNITED STATES PATENTS

| | | | |
|---|---|---|---|
| 551,511 | 12/1895 | Salenius | 285—336 X |
| 1,695,995 | 12/1928 | Coulston | 285—336 X |
| 1,940,074 | 12/1933 | Burmeister | 285—336 X |
| 2,246,600 | 6/1941 | Putnam et al. | 285—336 X |
| 2,260,542 | 10/1941 | Shaffer | 285—363 X |
| 2,687,909 | 8/1954 | Blackman et al. | 277—235 X |
| 2,764,311 | 9/1956 | Blackman. | |
| 3,078,110 | 2/1963 | Starr | 285—363 X |
| 3,124,366 | 3/1964 | Hillman | 277—235 X |

FOREIGN PATENTS

| | | |
|---|---|---|
| 1,183,464 | 1/1959 | France. |

CARL W. TOMLIN, *Primary Examiner.*

THOMAS F. CALLAGHAN, *Examiner.*